US008464746B2

(12) United States Patent
Chang et al.

(10) Patent No.: US 8,464,746 B2
(45) Date of Patent: Jun. 18, 2013

(54) AUTOMATIC WATER DISTRIBUTOR

(75) Inventors: Chunghsiang Chang, Taichung (TW); Weilong Chen, Wufong Township, Taichung County (TW)

(73) Assignee: Globe Union Industrial Corp., Taichung (TW)

( * ) Notice: Subject to any disclaimer, the term of this patent is extended or adjusted under 35 U.S.C. 154(b) by 365 days.

(21) Appl. No.: 12/973,895

(22) Filed: Dec. 20, 2010

(65) Prior Publication Data
US 2012/0152387 A1    Jun. 21, 2012

(51) Int. Cl.
*G05D 11/00*    (2006.01)
(52) U.S. Cl.
USPC ............ 137/119.04; 137/597; 251/127
(58) Field of Classification Search
USPC ............ 137/119.01, 119.03, 119.04, 119.05, 137/199.06, 119.08, 118.01, 118.06, 118.07, 137/597, 625.48, 512, 512.5, 543.13, 861, 137/871, 872, 883, 561 A; 251/127
See application file for complete search history.

(56) References Cited

U.S. PATENT DOCUMENTS

| 2,949,933 | A | * | 8/1960 | Moen | 137/625.17 |
| 5,881,754 | A | * | 3/1999 | Wei | 137/119.04 |
| 6,263,919 | B1 | * | 7/2001 | Knapp | 137/625.4 |
| 6,341,617 | B1 | * | 1/2002 | Wilson | 137/119.04 |
| 6,561,210 | B2 | * | 5/2003 | Hsieh et al. | 137/119.04 |
| 6,920,892 | B2 | * | 7/2005 | Agresta et al. | 137/119.04 |
| 8,267,112 | B2 | * | 9/2012 | Liu et al. | 137/119.04 |
| 2010/0012197 | A1 | * | 1/2010 | Liu | 137/119.04 |

* cited by examiner

*Primary Examiner* — Craig Schneider
*Assistant Examiner* — Seth Faulb

(57) ABSTRACT

An automatic water distributor contains a base including a chamber, a first outlet channel, a second outlet channel, and at least one inflow channel; between the chamber and the first outlet channel being defined a hole; a valve member including a valve core, the valve core including a plunger portion, a shaft portion, and a first passage, the first passage including a spout; a distributing plug retained on the top end of the shaft portion; a buffer device fixed in the chamber of the valve member and including a second passage, the second outlet channel, and a stop wall, wherein the stop wall keeps a buffer distance from the spout so that after the water sprayed from the spout flushes the stop wall, a watering reaction is forced on the plunger portion so that a downward movement of the valve core at a shifting instant is decreased.

18 Claims, 18 Drawing Sheets

AUTOMATIC WATER DISTRIBUTOR

BACKGROUND OF THE INVENTION

1. Field of the Invention

The present invention relates to an automatic water distributor.

2. Description of the Prior Art

A conventional automatic water distributor is used in a shower faucet to distribute water by ways of water pressure so that the water sprays from the shower faucet or a shower. However, when switching a water spray type, a water hammer effect will occur to generate shock and noise. In addition, when at a lower pressure, the water can not be distributed well.

Therefore, an improved automatic water distributor is developed and disclosed in CN Patent No. 201186249Y.

However, when a watering function of the faucet is shifted to a spraying function of the spray shower head, the distributing plug is pushed by a returning spring easily to return backward to close the hole, and a water hammer effect generates due to a raised rim around the hole of a fitting member impacts the distributing plug, making noise.

Besides, the check valve is comprised of a water stop plunger made of a rubber material, and a size precision of the water stop plunger is quite high, thus increasing production cost. For example, an interference fitting size of the water stop plunger is limited within 0.1-0.5 mm, but a standard size of general water stop plungers is limited within 0.3-0.5 mm, therefore excessive interference fitting size will cause a friction between the water stop plunger and the hole to lower water distributing effect at a low water pressure.

Because a working precision of the water stop plunger is high, a smooth surface of the water stop plunger is difficult to achieve, and a hardness of the water stop plunger is high as well, a tight close effect can not be obtained, so the automatic water distributor can not pass a backsiphonage test.

A deformation of the peripheral rib of the water stop plunger is variable greatly, accordingly a watering area becomes large that can not control a watering amount exactly.

The present invention has arisen to mitigate and/or obviate the afore-described disadvantages.

SUMMARY OF THE INVENTION

The primary object of the present invention is to provide an automatic water distributor which is capable of overcoming the shortcomings of the conventional automatic water distributor.

To obtain the above objectives, a faucet connecting structure provided by the present invention contains:

a base including a chamber, a first outlet channel connected with an upper end of the chamber, a second outlet channel connected with a lower end of the chamber, and at least one inflow channel communicating with one side of the chamber; between the chamber and the first outlet channel being defined a hole;

a valve member including a valve core, the valve core including a plunger portion and a shaft portion extending upward from the plunger portion; the plunger portion moving vertically along the chamber of the base, a top end of the shaft portion inserting into the first outlet channel via the hole, and the valve core also including a first passage fixed therein, the first passage including a spout to spray water downward; a distributing plug retained on the top end of the shaft portion of the valve core and moving vertically with the valve core to disengage upward and open the hole or to move downward to close the hole;

a buffer device fixed in the chamber of the valve member and including a second passage to communicate with the spout and the second outlet channel, and including a stop wall disposed thereon and located at a spraying path of the spout, wherein the stop wall keeps a buffer distance from the spout so that after the water sprayed from the spout flushes the stop wall, a watering reaction is forced on the plunger portion of the valve core so that a downward movement of the valve core at a shifting instant is decreased.

Thereby, when the stop wall of the buffer device is flushed by sprayed water from the spout, a flowing reaction generates and forces on the valve core so that after a watering function of the faucet is shifted to a spraying function of the spray shower head, an impact between the distributing plug of the valve core and the hole of the base is decreased to limiting a water hammer effect.

The check valve is used to replace conventional check valve made of rubber material, and the C-shaped retaining loop is retained in the slot of the plunger portion of the valve core so that the plunger moves along the chamber by using the C-shaped retaining loop, hence at a low water pressure, the water is still capable of being distributed well.

Also, the check valve is capable of providing a checking effect so that the automatic water distributor passes the backsiphonage test.

A diameter of the axial second orifice is less than ⅓ diameter of the spout so that the stop wall on the spraying path of the spout is capable of providing enough stopping area to generate sufficient flowing reaction to control water flow stably.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
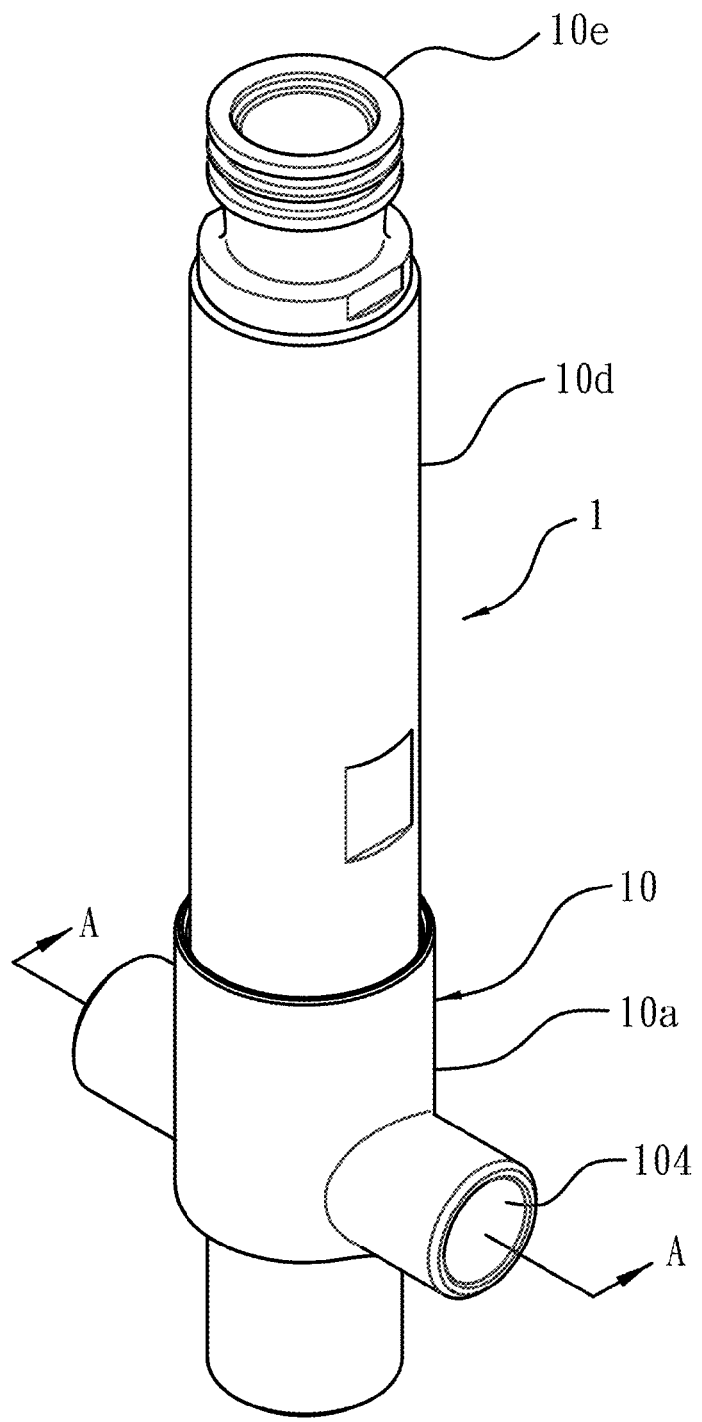
FIG. 1 is a perspective view showing the assembly of an automatic water distributor according to a first embodiment of the present invention.
Figure 2:
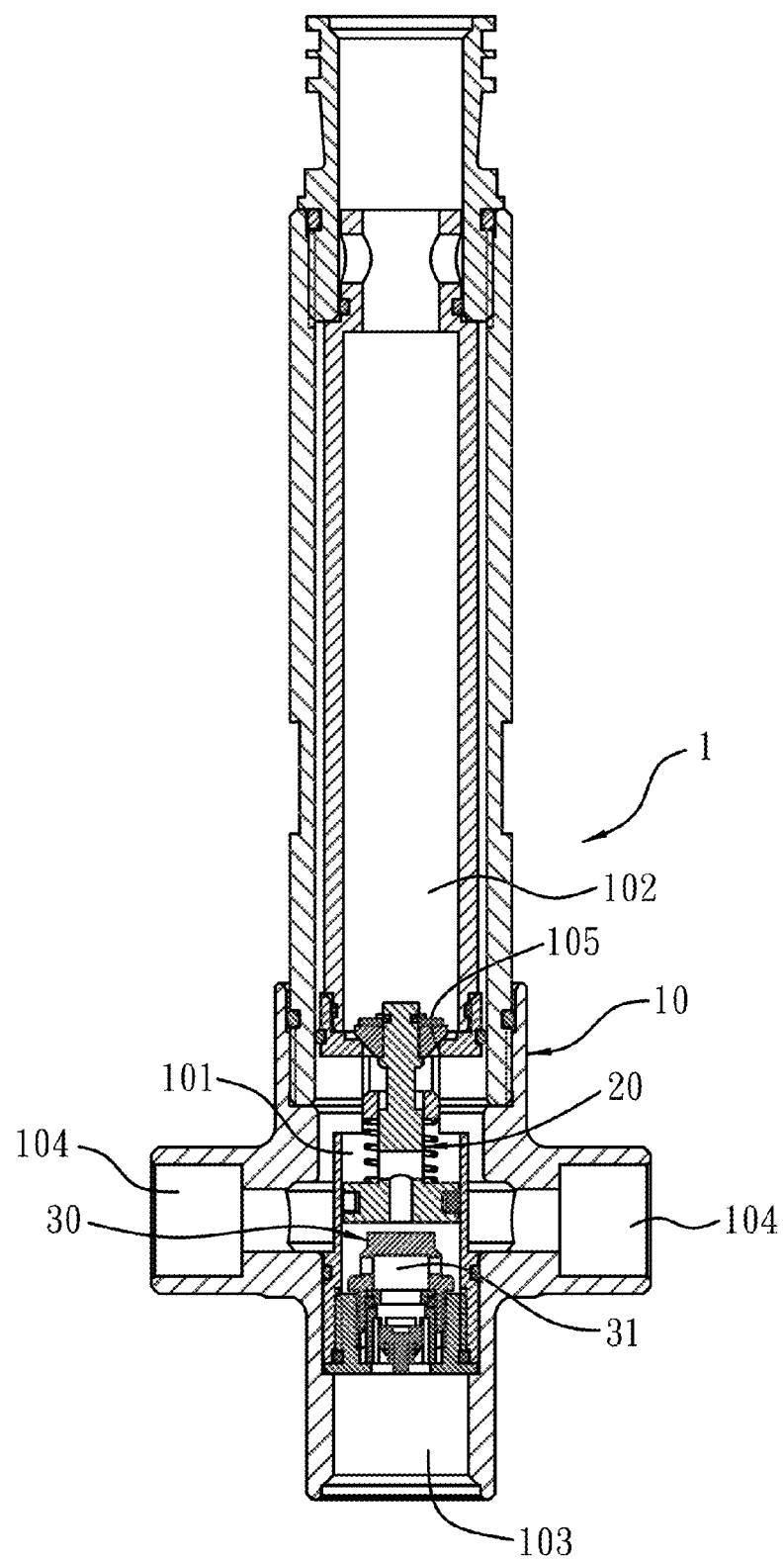
FIG. 2 is a cross sectional view taken along the line A-A of FIG. 1.
Figure 3:
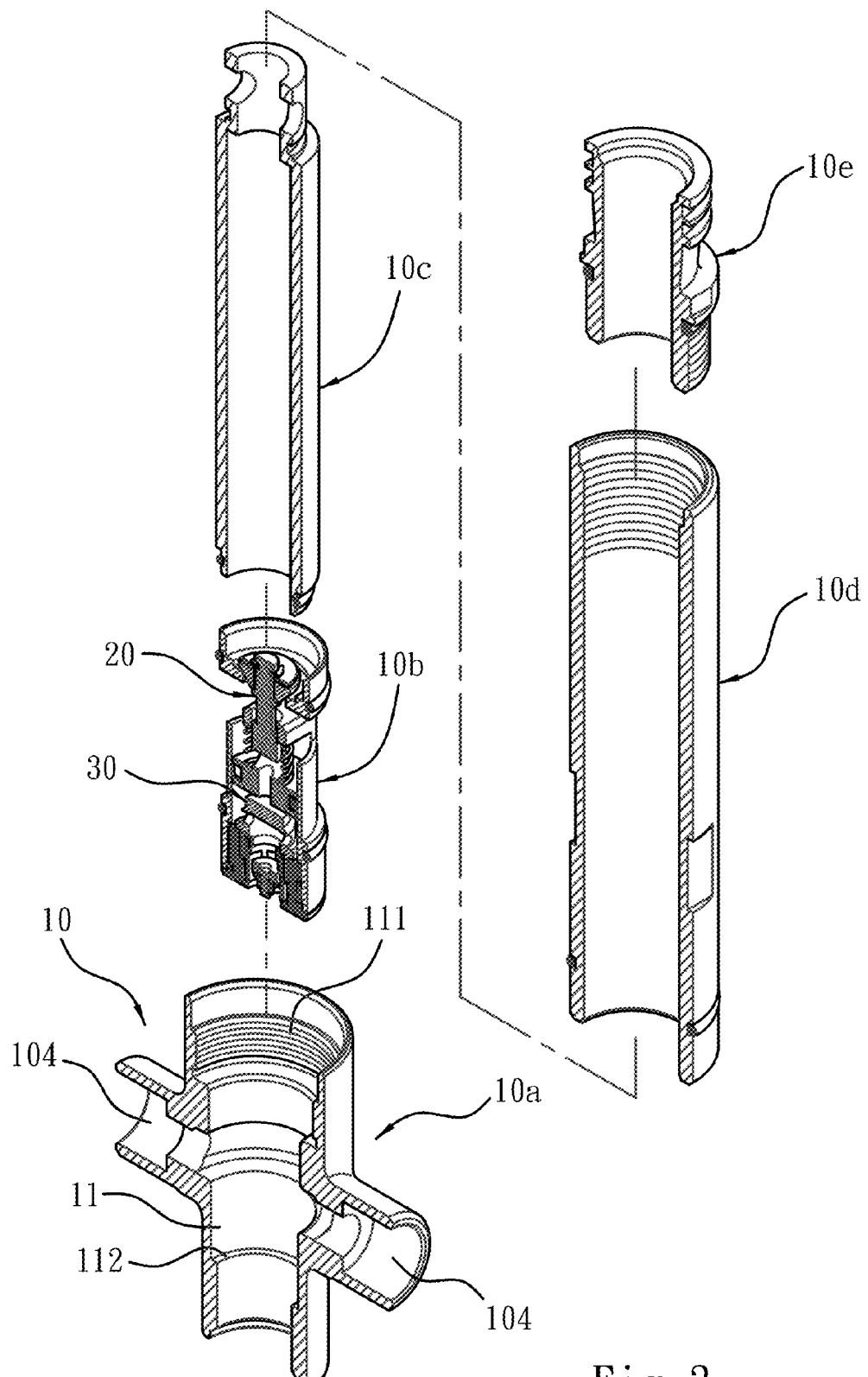
FIG. 3 is a cross-sectional perspective view showing the exploded components of the automatic water distributor according to the first embodiment of the present invention.

Referring to FIGS. 1-3, an automatic water distributor 1 according to a first embodiment of the present invention comprises a base 10, a valve member 20, and a buffer device 30.

Figure 4:
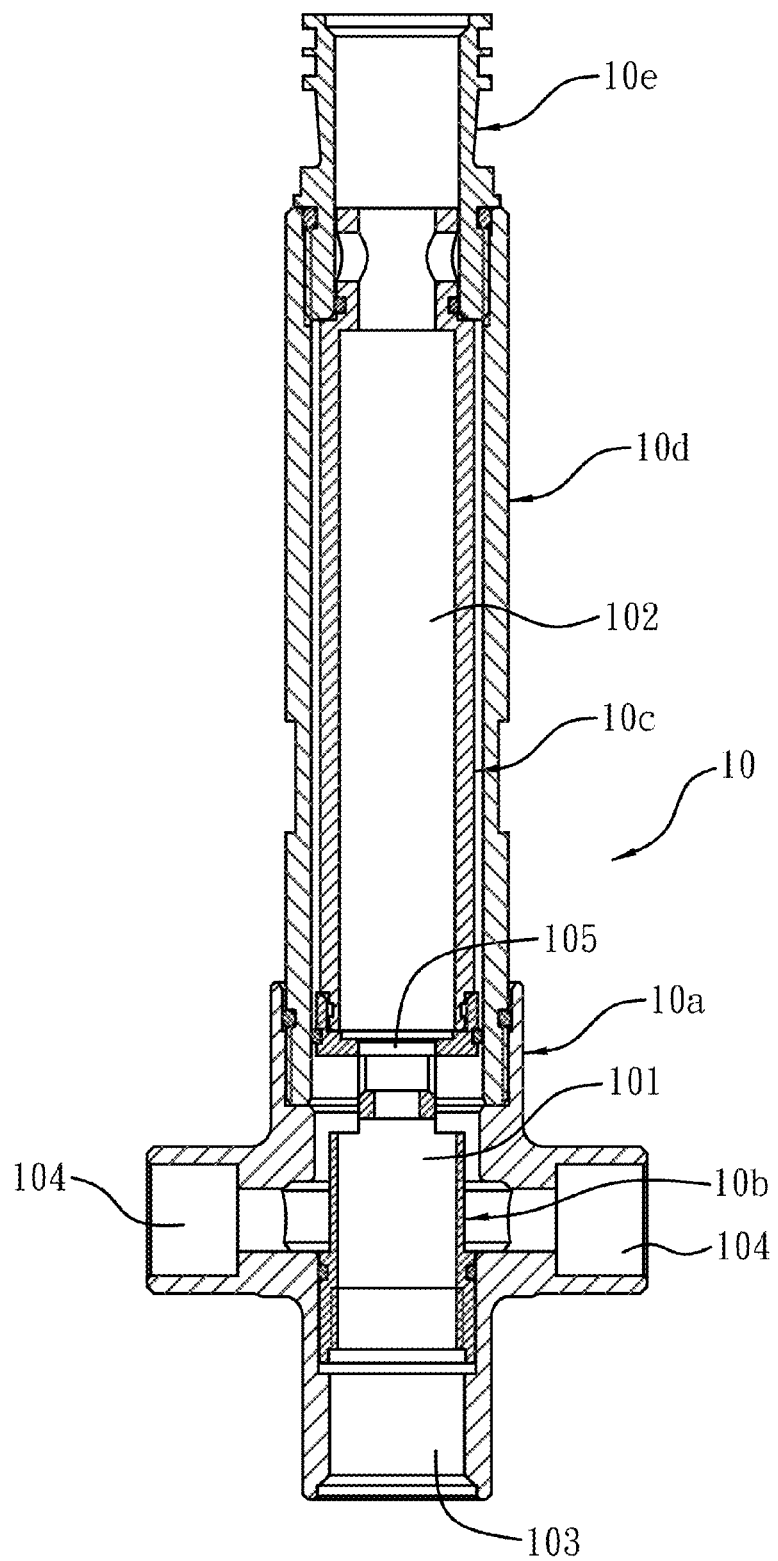
FIG. 4 is a cross sectional view showing the assembly of a base of the automatic water distributor according to the first embodiment of the present invention.

The base 10, as shown in FIG. 4, includes a chamber 101, a first outlet channel 102 connected with an upper end of the chamber 101, a second outlet channel 103 connected with a lower end of the chamber 101, and two inflow channels 104 communicating with two sides of the chamber 101 respectively; between the chamber 101 and the first outlet channel 102 is defined a hole 105.

The base 10 also includes a fixing seat 10a, a valve holder 10b, an internal outlet tube 10c, an external outlet tube 10d, and an outflow connector 10e.

The fixing seat 10a is formed in a cross shape and includes a cross first tunnel 11 to define the two inflow channels 104, and the first tunnel 11 includes a screwing portion 111 disposed on an upper end thereof, the second outlet channel 103 fixed on a lower end thereof, and a first positioning fringe 112 formed on an inner wall of the first tunnel 11 thereof.

Figure 5:
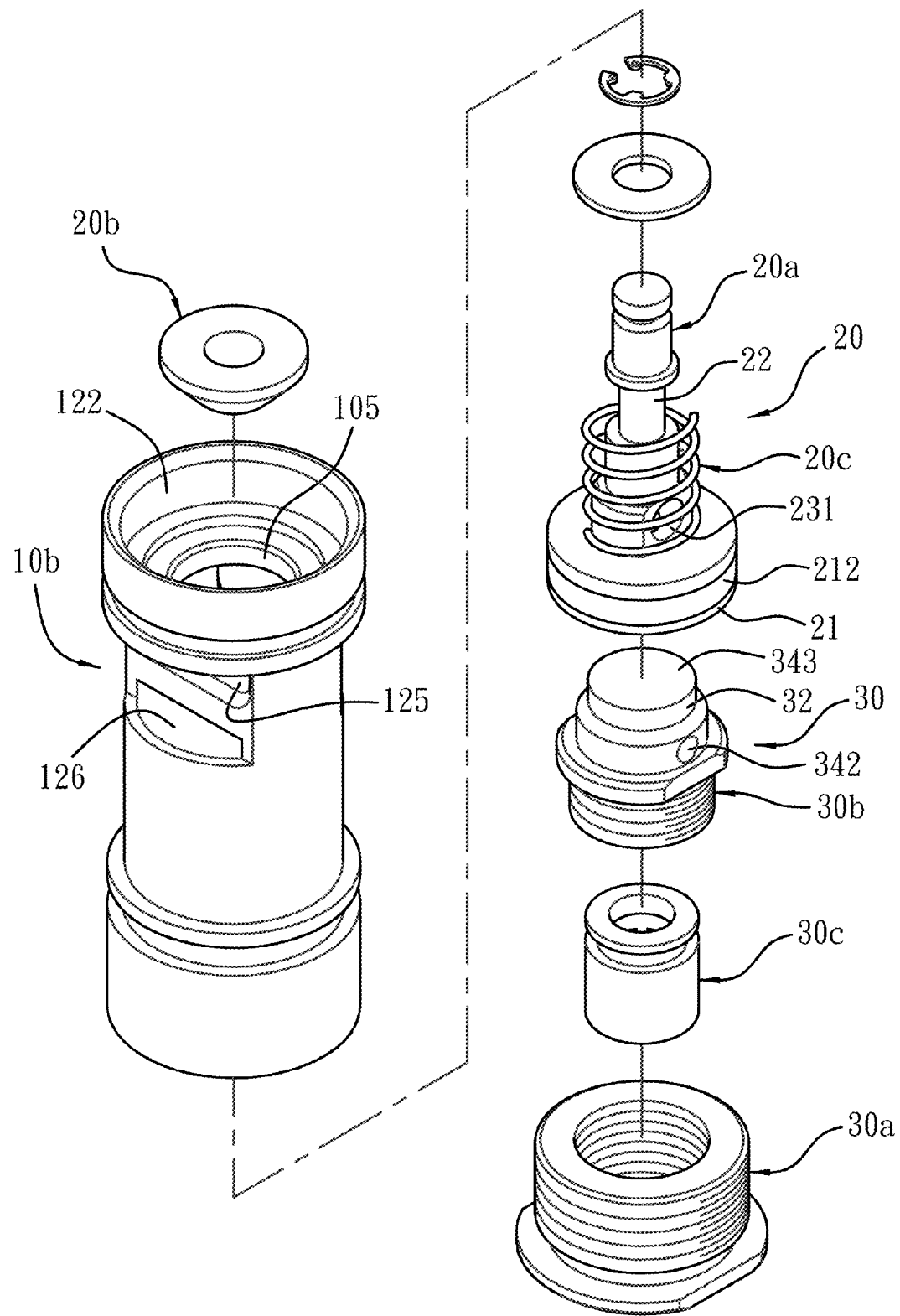
FIG. 5 is a perspective view showing the exploded components of a valve holder, a valve member, and a buffer device of the automatic water distributor according to the first embodiment of the present invention.
Figure 6:
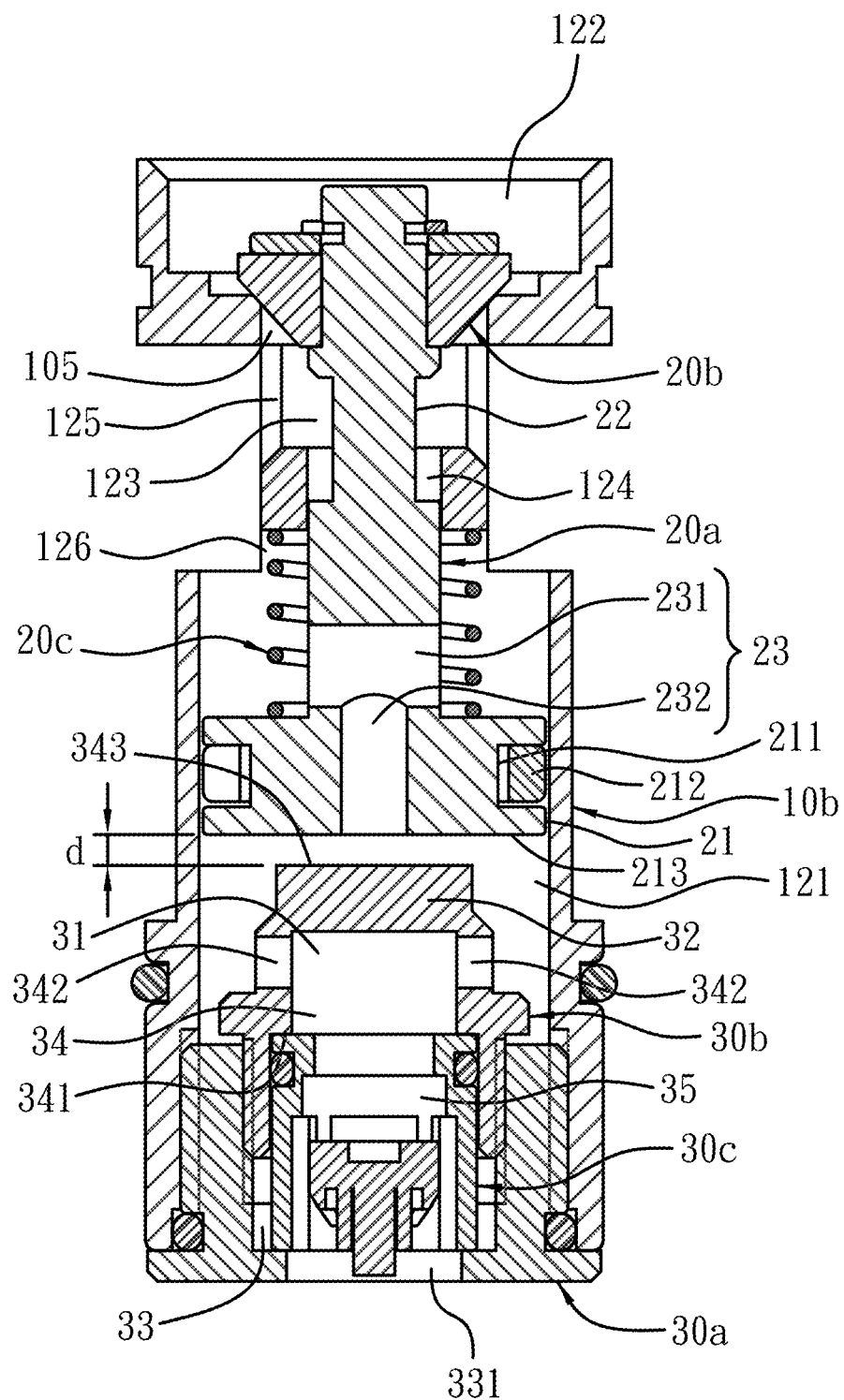
FIG. 6 is a cross sectional view showing the assembly of the valve holder, the valve member, and the buffer device of the automatic water distributor according to the first embodiment of the present invention.

The valve holder 10b, as illustrated in FIGS. 5 and 6, is formed in a tube shape and fixed in the first tunnel 11 of the fixing seat 10a, and a bottom end of the valve holder 10b is limited by the first positioning fringe 112.

The valve holder 10b also includes a second tunnel 12 arranged therein, the second tunnel 12 includes a first compartment 121, a groove 122, a second compartment 123 between the first compartment 121 and the groove 122, a guiding bore 124 between the second compartment 123 and the first compartment 121, and the hole 105 between the second compartment 123 and the groove 122; the first compartment 121, the guiding bore 124, and the second compartment 123 are provided to define the chamber 101. The groove 122 is used to define a small part of the first outlet channel 102.

The valve holder 10b further includes two opposite first inlets 125 disposed on a peripheral wall of the second compartment 123 to communicate with the inflow channels 104 and the second compartment 123 and includes two opposite second inlets 126 fixed on a top end of the first compartment 121 to communicate with the inflow channels 104 and the first compartment 121 individually.

The internal outlet tube 10c engages with the groove 122 of the valve holder 10b and is applied to define most part of the first outlet channel 102 therein.

The external outlet tube 10d is fitted on the internal outlet tube 10c and screwed with the screwing portion 111 of the fixing seat 10a.

The outflow connector 10e is screwed with a top end of the external outlet tube 10d and is biased against an outer peripheral wall of an upper side of the internal outlet tube 10c so that the internal outlet tube 10c and the valve holder 10b are received and limited among the outflow connector 10e, the external outlet tube 10d, and the fixing seat 10a. The outflow connector 10e is capable of defining a small part of the first outlet channel 102.

Figure 7:
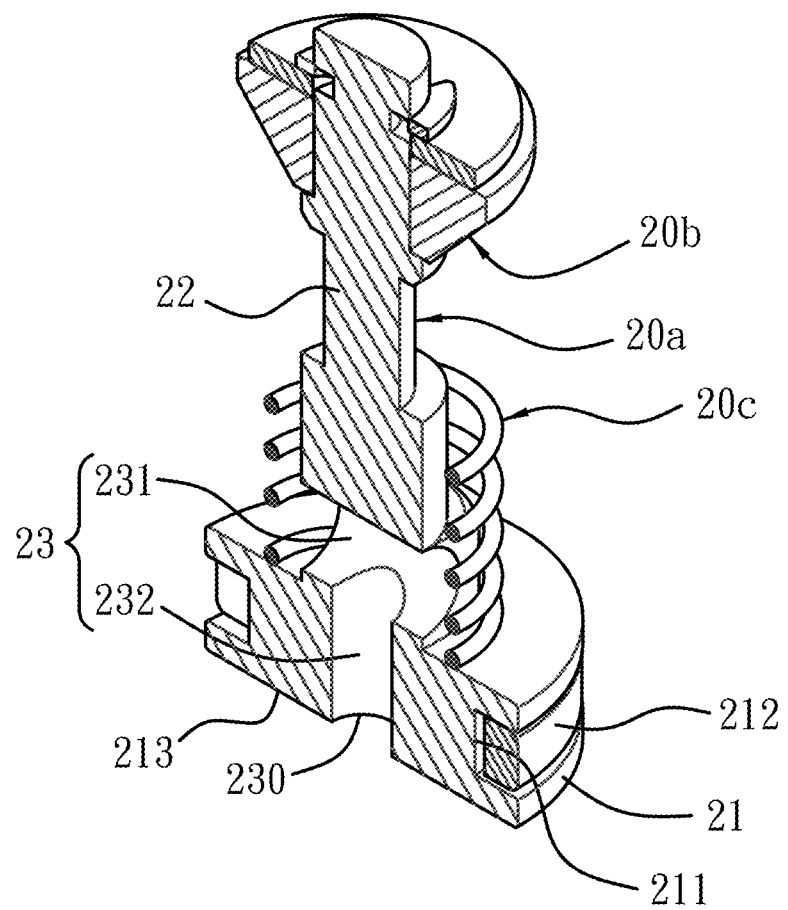
FIG. 7 is a cross-sectional perspective view showing the assembly of the valve member of the automatic water distributor according to the first embodiment of the present invention.

The valve member 20, as shown in FIGS. 5-7, includes a valve core 20a, a distributing plug 20b, and a resilient element 20c.

The valve core 20a includes a plunger portion 21 and a shaft portion 22 extending upward from the plunger portion 21; the plunger portion 21 moves vertically along the chamber 101 of the base 10, a top end of the shaft portion 22 inserts into the first outlet channel 102 via the hole 105, and the valve core 20a also includes a first passage 23 fixed therein, wherein the first passage 23 is formed in a Tee shape and includes a radial first aperture 231 formed adjacent to a bottom end thereof so as to communicate with the shaft portion 22, an axial second aperture 232 arranged at a central position of a bottom end of the plunger portion 21 to communicate with the first aperture 231 so that water in the chamber 101 and above the plunger portion 21 is guided to flow below the plunger portion 21 along the first aperture 231 and the second aperture 232. It is to be noted that the second aperture 232 includes a spout 230 defined on a bottom end thereof to spray water downward.

The plunger portion 21 of the valve core 20a includes a slot 211 formed on an outer peripheral surface thereof to retain a C-shaped retaining loop 212 so that the plunger 21 moves along the chamber 101 by using the C-shaped retaining loop 212.

The distributing plug 20b is formed in a upside-down cone shape to be retained on the top end of the shaft portion 22 of the valve core 20a and moves vertically with the valve core 20a; when the distributing plug 20b moves upward to disengage upward and open the hole 105, the water flowing into the first inlets 125 further flows toward the first outlet channel 102; and when the distributing plug 20b moves downward, it closes the hole 105 to stop the water.

The resilient element 20c is a compression spring to abut against the valve core 20a so that the distributing plug 20b moves downward to close the hole 105.

Figure 8:
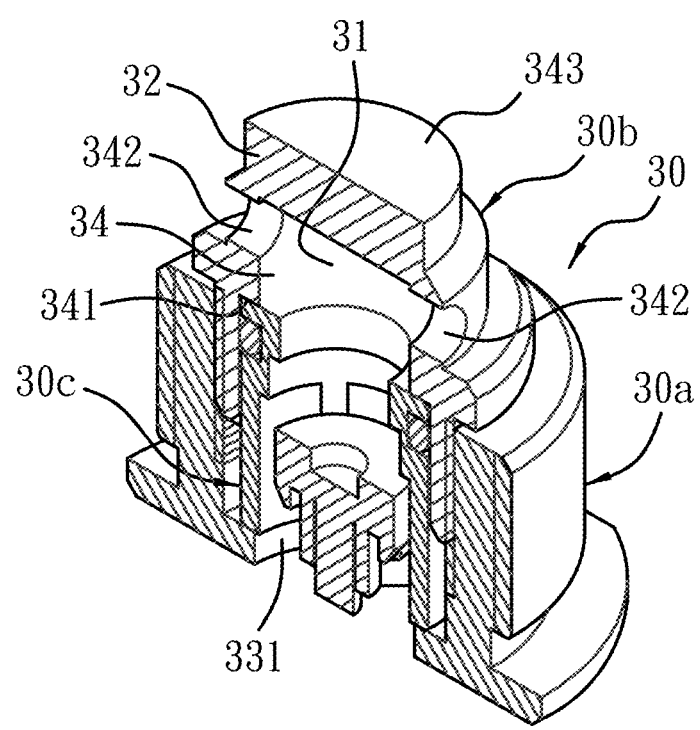
FIG. 8 is a cross-sectional perspective view showing the assembly of the buffer device of the automatic water distributor according to the first embodiment of the present invention.

The buffer device 30, as illustrated in FIGS. 5, 6, and 8, is fixed in the chamber 101 of the valve member 20 and includes a second passage 31 to communicate with the spout 230 and the second outlet channel 103, and includes a stop wall 32 disposed thereon and located at a spraying path of the spout 230, the stop wall 32 keeps a buffer distance d from the spout 230 so that after the water sprayed from the spout 230 flushes the stop wall 32, a watering reaction is forced upward to a bottom face 213 of the plunger portion 21 of the valve core 20a so that a downward movement of the valve core 20a at a shifting instant is decreased.

It is to be noted that the buffer distance increases or decreases with an upper or a downward movement of the valve core 20a, and it is limited from 0.5 mm to 5 mm.

The buffer device 30 also includes a limiting component 30a, a stopping component 30b, and a check valve 30c.

The limiting component 30a is screwed with a bottom end of the first compartment 121 and includes a first recess 33 secured on a top end thereof, the first recess 33 includes a first orifice 331 disposed on a central position of a bottom wall thereof.

The stopping component 30b includes an opening facing downward and is formed in a cylinder shape, an outer wall to screw with the first recess 33 of the positioning component 30a, and a cylindrical room 34 defined therein, the cylindrical room 34 includes a second positioning fringe 341 disposed on an inner wall thereof and two opposite third apertures 342 fixed on a peripheral side thereof to guide the water from the spout 230 to further flow into the cylindrical room 34; the stop wall 32 is comprised of a top face 343 of the stopping component 30b, and the buffer distance d is formed from the top face 343 of the stopping component 30b to the bottom face 213 of the plunger portion 21.

The check valve 30c is fixed in the first recess 33 of the limiting component 30a and the cylindrical room 34 of the stopping component 30b and is limited by the second positioning fringe 341 of the stopping component 30b and includes a third passage 35 formed therein.

The second passage 31 of the buffer device 30 is defined by the third apertures 342, a part of the cylindrical room 34, the third passage 35 of the check valve 30c, and the first orifice 331 of the limiting component 30a and is capable of guiding the water from the spout 230 to further flow into the second outlet channel 103.

In assembly, as shown in FIGS. 3 and 5, the valve core 20a fitted with the resilient element 20c is fixed in the chamber 101 from the bottom end of the valve holder 10b so that the shaft portion 22 of the valve core 20a is inserted upward via the guiding bore 124 and the hole 105, and then the distributing plug 20b is positioned on the top end of the shaft portion 22 from the hole 105, thereafter the limiting component 30a of the buffer device 30 is screwed with the bottom end of the valve holder 10b so that the valve holder 10b, the valve core 20a, and the buffer device 30 are fixed from the fixing seat 10a, then the internal outlet tube 10c is retained on the top end of the valve holder 10b, the external outlet tube 10d is screwed with the top end of the fixing seat 10a, the top end of the outflow connector 10e is limited, thereby assembling the automatic water distributor 1.

Figure 9:
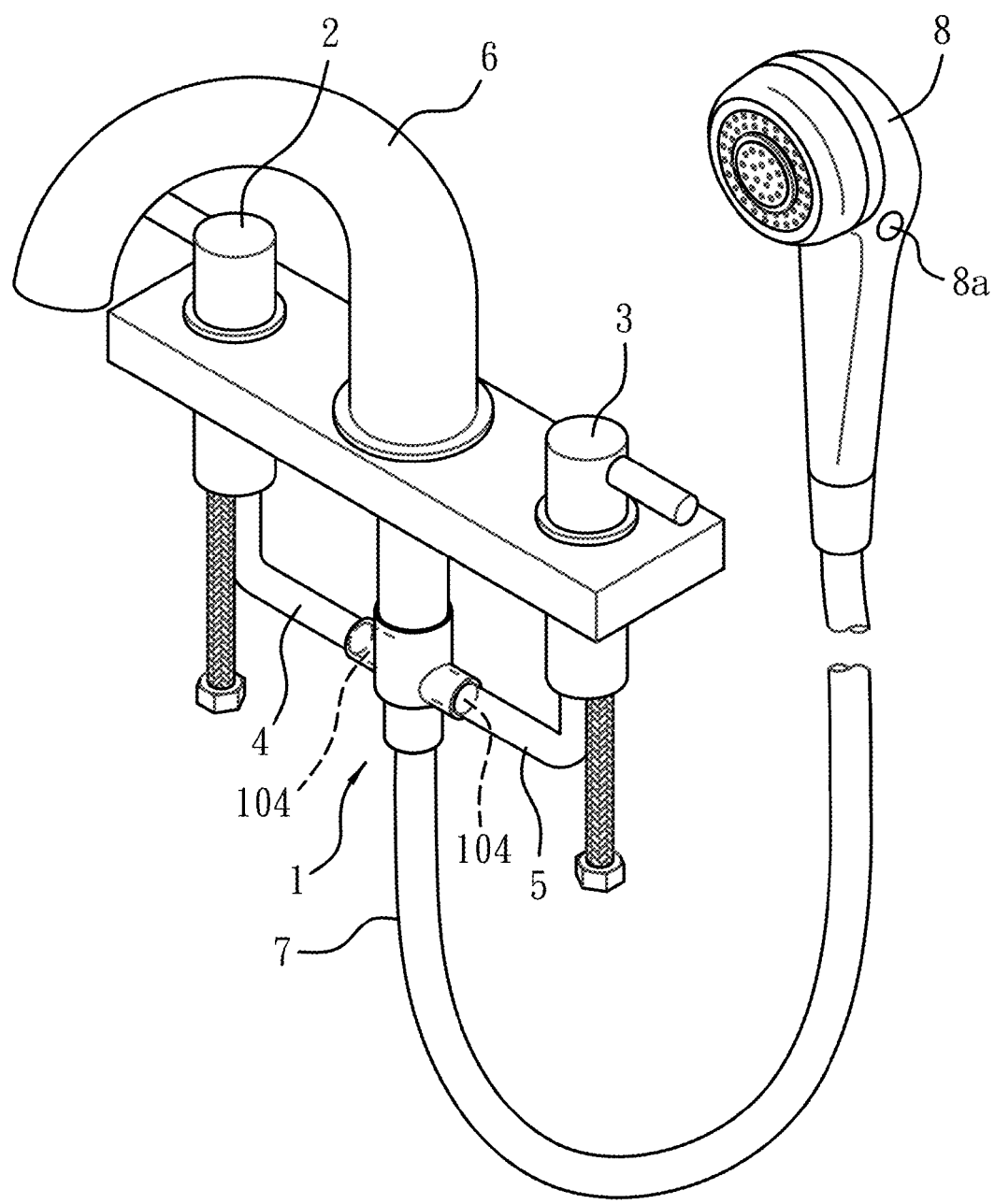
FIG. 9 is a perspective view showing the buffer device of the automatic water distributor according to the first embodiment of the present invention being fixed onto a bath faucet device.
Figure 10:
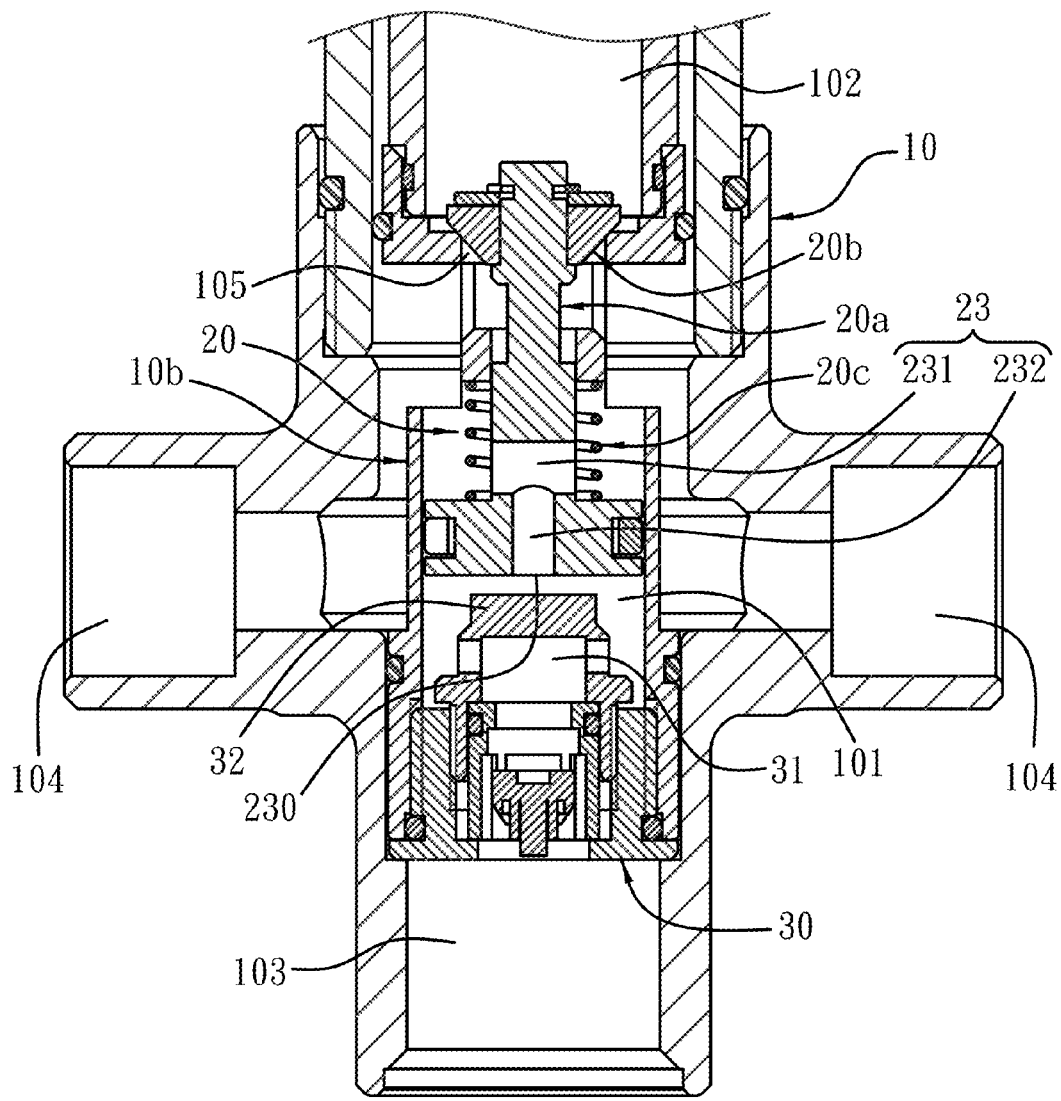
FIG. 10 is a cross sectional view showing the operation of the automatic water distributor according to the first embodiment of the present invention.

With reference to FIG. 9, the automatic water distributor 1 is fixed onto a bath faucet device, and the bath faucet device includes a cold-water switch 2, a hot-water switch 3, a cold-water inflow pipe 4 connected with the cold-water switch 2 and one of the two inflow channels 104, a hot-water inflow pipe 5 connected between the hot-water switch 3 and the other inflow channel 104, a faucet 6 retained with the outflow connector 10e, a hose 7 coupled with the second outlet channel 103 of the fixing seat 10a, and a spray shower head 8 fixed on another end of the hose 7 and having a controlling button 8a, such that when the cold-water switch 2 and the hot-water switch 3 are not turned on, since there is no water pressure existing in the automatic water distributor 1, the resilient element 20c moves downward to abut against the valve core 20 so that the distributing plug 20b contacts with the hole 105 completely, thus closing the hole 105 as shown in FIG. 10.

It is to be noted that because an area of a top surface of the plunger portion 21 of the valve core 20a to bear the water pressure is more than an area of the distributing plug 20b to bear the water pressure, when the automatic water distributor 1 generates a water-pressure action therein, the valve core 20a and the distributing plug 20b are pressed by the resilient element 20c, and a pressure difference between the area of the top surface of the plunger portion 21 to bear the water pressure and the area of the distributing plug 20b to bear the water pressure actuates the valve core 20a and the distributing plug 20b to move downward so that the distributing plug 20b closes the hole 105 tightly.

Figure 11:
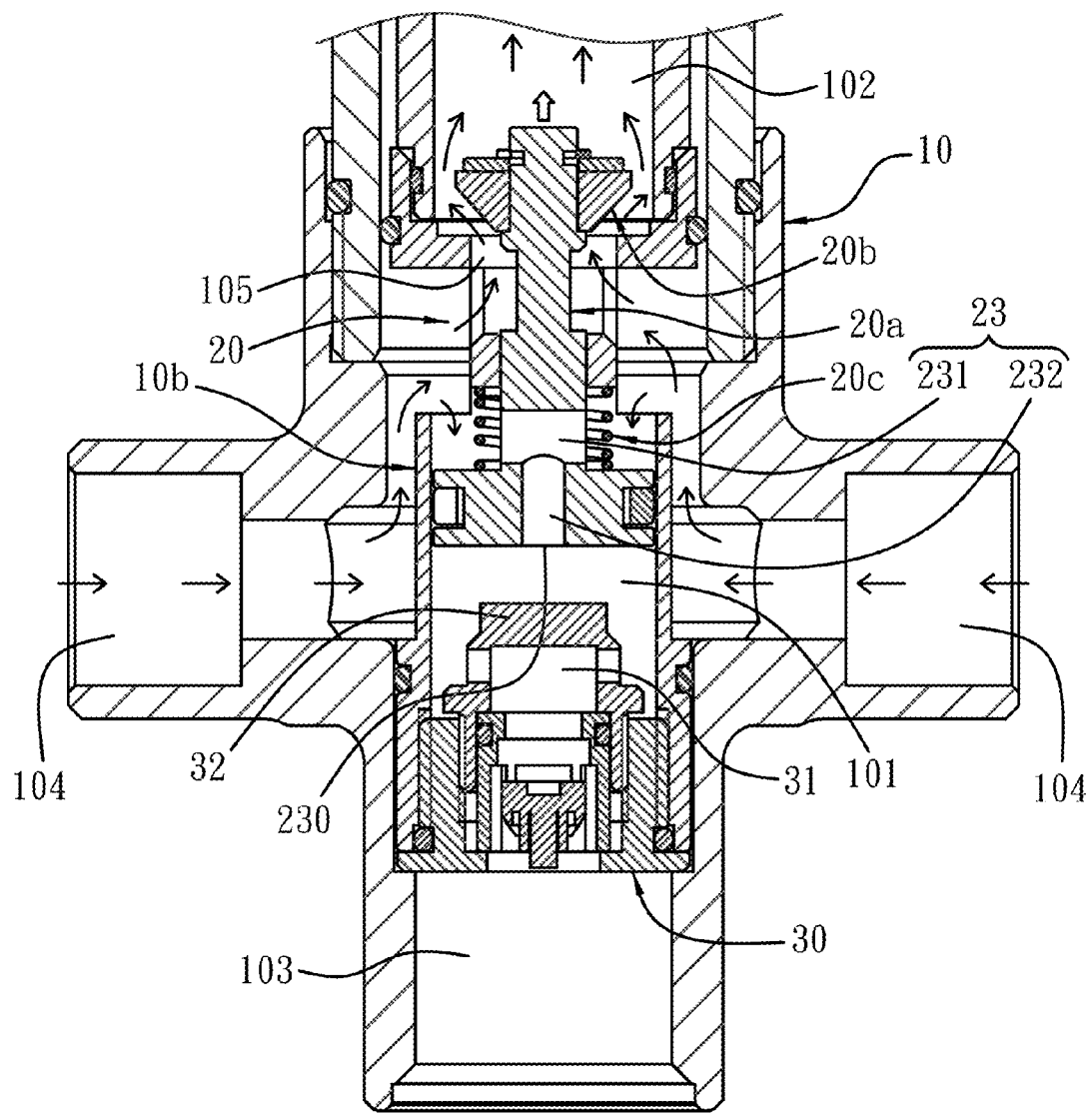
FIG. 11 is another cross sectional view showing the operation of the automatic water distributor according to the first embodiment of the present invention.

When the cold-water switch 2 and/or the hot-water switch 3 are/is turned on, the water from the cold-water inflow pipe 4 and/or the hot-water inflow pipe 5 flows into the chamber 101 via the fixing seat 10a and/or the inflow channels 104. It is to be noted that when the water flows into the second outlet channel 103 via the first passage 23 and the second passage 31 of the buffer device 30 from the second inlets 126 of the valve holder 10b, it is full of the hose 7 and the spray shower head 8, and a water pressure generates in the automatic water distributor 1 so that the distributing plug 20b engages with the hole 105, therefore when the controlling button 8a of the spray shower head 8 is not turned on, the water from the spray shower head 8 can not flow, and water flowing into the automatic water distributor 1 constantly is forced to further flow toward the faucet 6 and acts against the pressure difference and the resilient element 20c, hence the distributing plug 20b and the valve core 20a are pushed to move upward as illustrated in FIG. 11 so that the distributing plug 20b disengages from the hole 105, and then the water flows out of the faucet 6 through the hole 105 and the first outlet channel 102.

Figure 12:
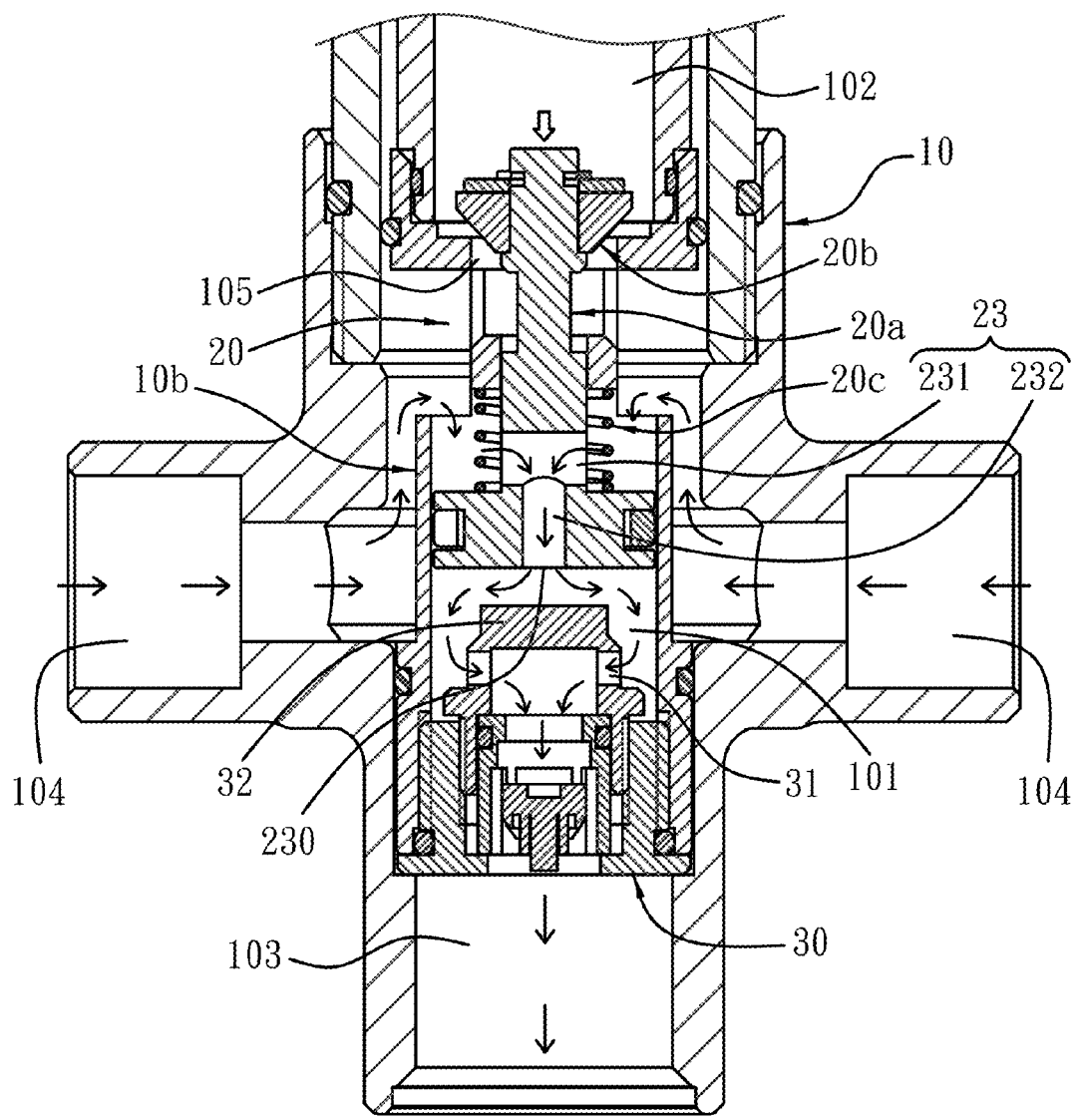
FIG. 12 is another cross sectional view showing the operation of the automatic water distributor according to the first embodiment of the present invention.

In addition, when the controlling button 8a of the spray shower head 8 is pressed, the water in the automatic water distributor 1 sprays out of the spray shower head 8 along the hose 7, accordingly the water pressure generates in the automatic water distributor 1 so that the valve core 20a and the distributing plug 20b are acted by the pressure difference and the resilient element 20c to move downward as illustrated in FIG. 12 so as to close the hole 105, thereby shifting water flow between a watering function of the faucet and a spraying function of the spray shower head.

However, at a high water pressure, e.g., when the water pressure from the inflow channels 104 is enough, although the resilient element 20c does not act, a sufficient pressure difference between the valve core 20a and the distributing plug 20b is still generated to shift watering and spraying function. But at a low water pressure, the hole 105 is not closed completely, so water leaks from the faucet 6 or a watering function of the faucet and the spraying function of the spray shower head 8 are not sifted smoothly, hence the resilient element 20c has to be used to overcome above-mentioned problem, but a water hammer effect will occur.

The buffer device 30 is served in the automatic water distributor 1 so that when the watering function of the faucet is shifted to the spraying function of the spray shower head, even though the distributing plug 20b still moves downward with the valve core 20a to impact and close the hole 105, the plunger portion 21 of the valve core 20a moves downward, and the water sprays out of the spout 230 of the plunger portion 21, then an acting force generates because the water flushing the stop wall 32 of the buffer device 30 forces on the plunger portion 21 so that a downward movement of the valve core 20a is lowered to greatly decrease an impact between the distributing plug 20b and the hole 105, limiting the water hammer effect.

Figure 13:
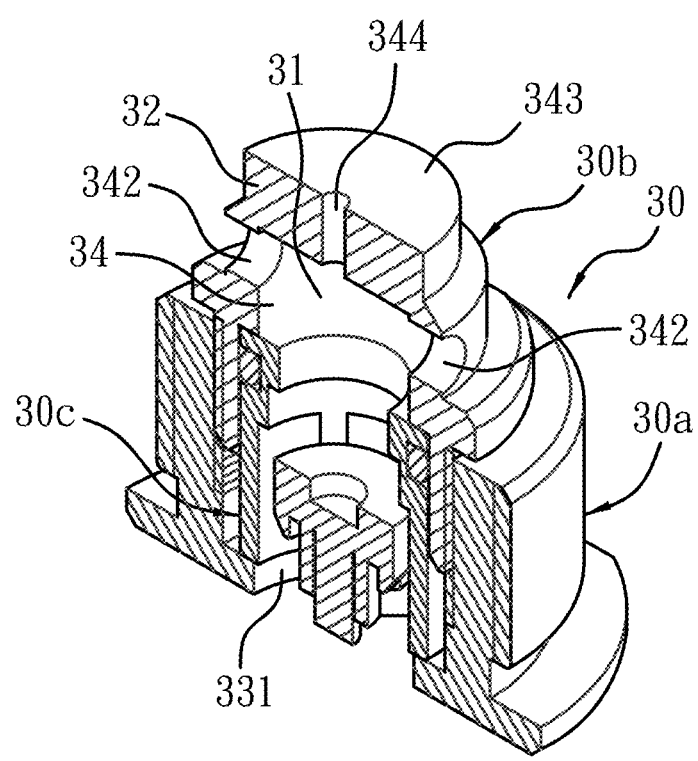
FIG. 13 is a cross-sectional perspective view showing the assembly of a buffer device of an automatic water distributor according to a second embodiment of the present invention.
Figure 14:
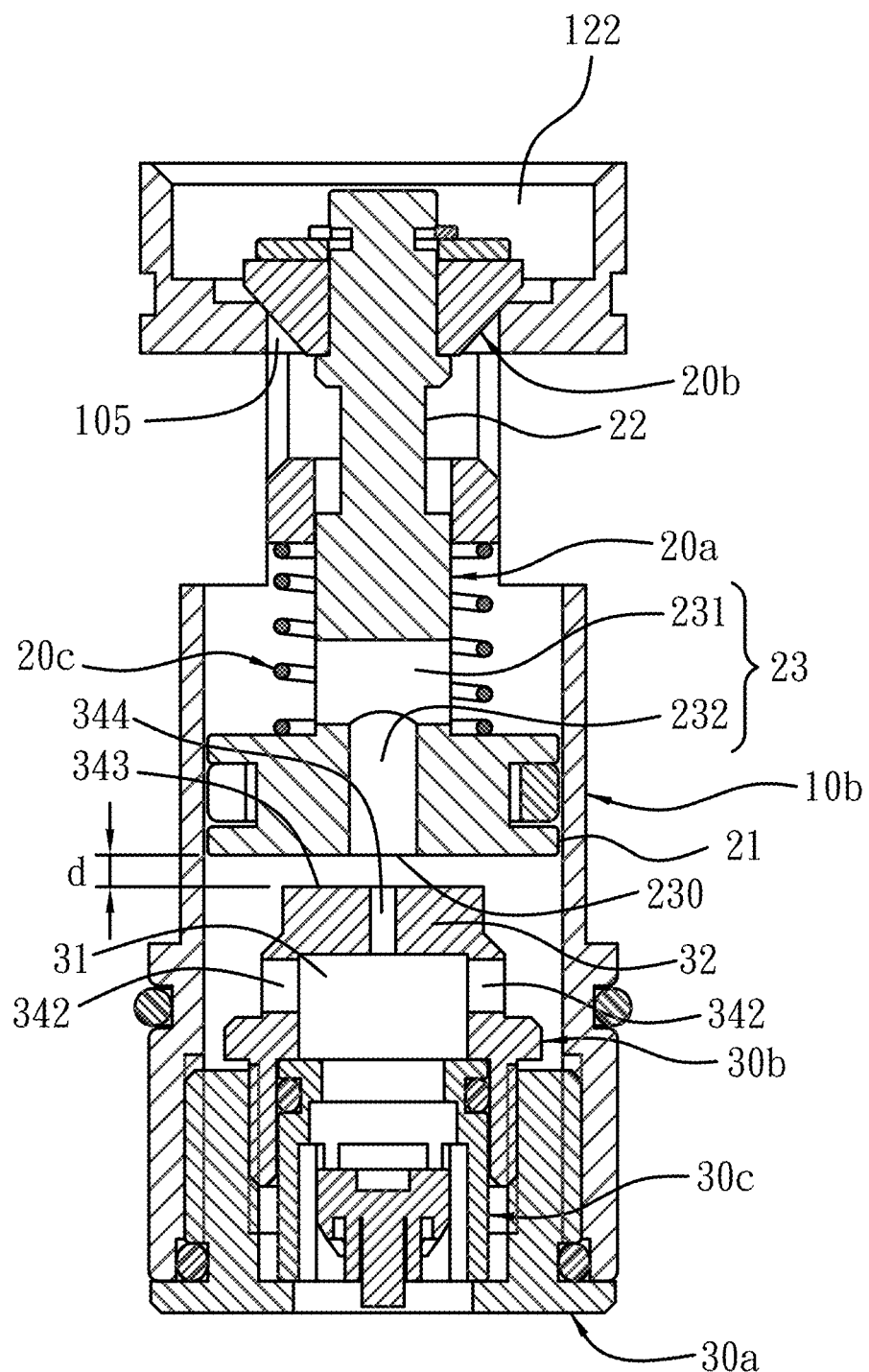
FIG. 14 is a cross sectional view showing the assembly of a valve holder, a valve member, and the buffer device of the automatic water distributor according to the second embodiment of the present invention.

Referring to FIGS. 13 and 14, a difference of an automatic water distributor 1 according to a second embodiment of the present invention from that of the first embodiment comprises:

a buffer device 30 including a stop wall 32, and the stop wall 32 including an axial second orifice 344 to form one part of a second passage 31 disposed on a spraying path of a spout 230, a diameter of the axial second orifice 344 is less than ⅓ diameter of the spout 230 so that the stop wall 32 on the spraying path of the spout 230 is capable of providing enough stopping area to generate sufficient flowing reaction.

Figure 15:
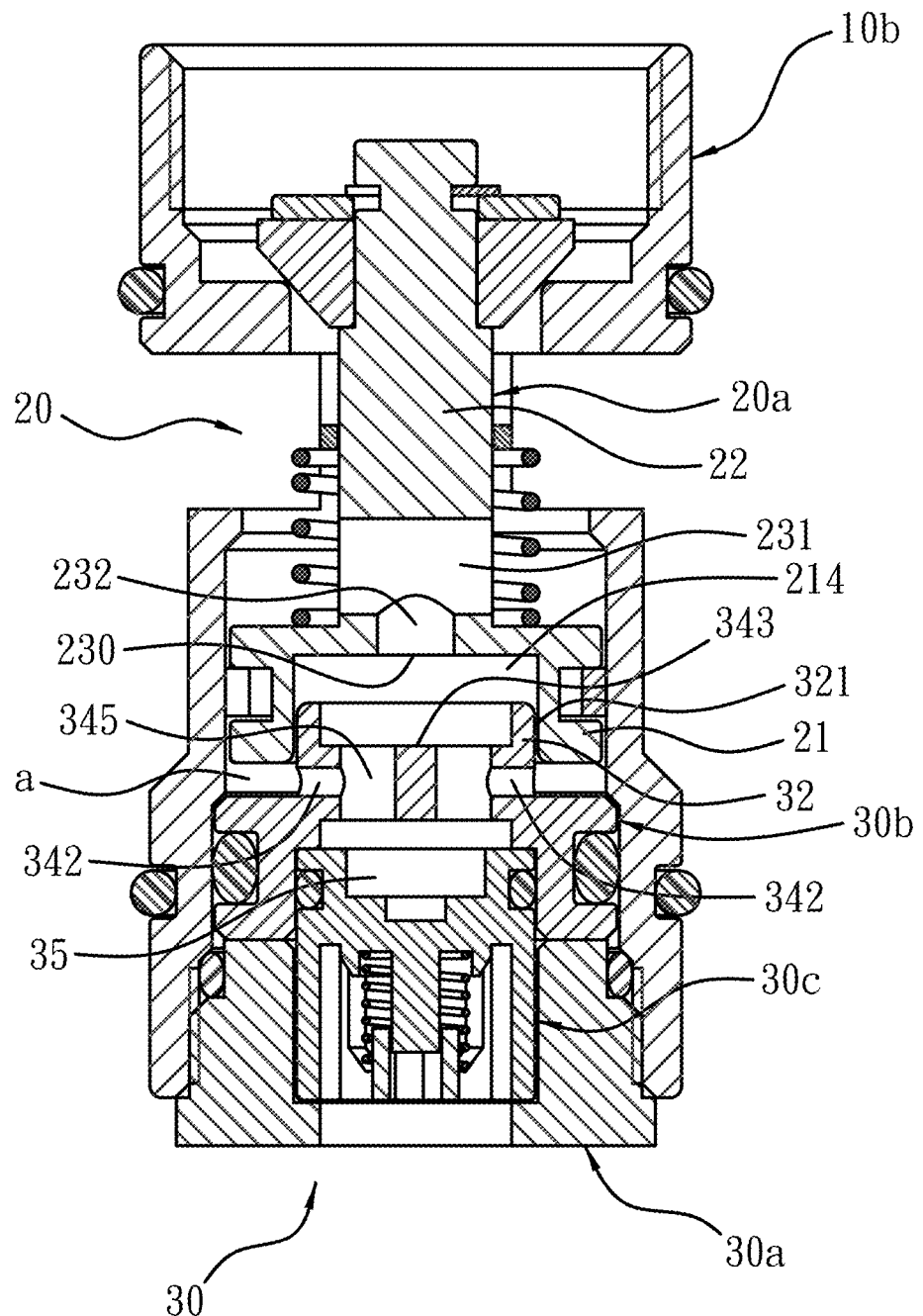
FIG. 15 is a cross sectional view showing the assembly of a valve holder, a valve member, and a buffer device of an automatic water distributor according to a third embodiment of the present invention.
Figure 16:
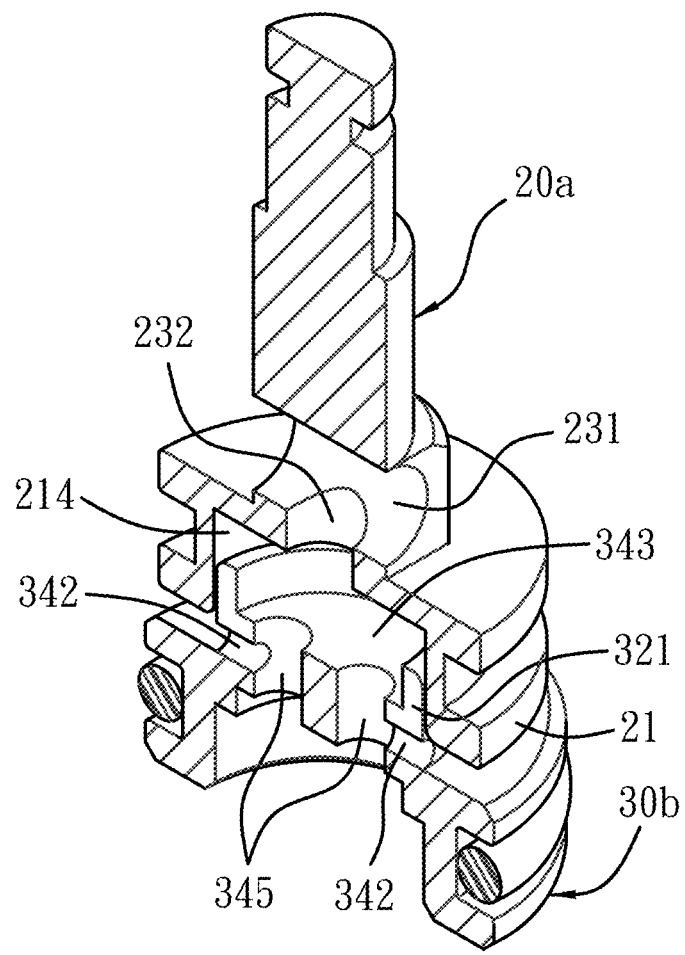
FIG. 16 is a cross-sectional perspective view showing the assembly of a stopping component and a valve core of the automatic water distributor according to the third embodiment of the present invention.

Referring to FIGS. 15 and 16, a difference of an automatic water distributor 1 according to a third embodiment of the present invention from that of the first embodiment comprises:

a valve core 20a including a plunger portion 21, and the plunger portion 21 including a second recess 214 fixed on a bottom end thereof;

a buffer device 30 including a stopping component 30b, the stopping component 30b including a stop wall 32 secured on a top end thereof, and the stop wall 32 including a peripheral fence 321 extending upward therefrom so that the stopping component 30b is fitted into the second recess 214, and the stop wall 32 also including two axial third orifices 345 spaced apart a predetermined distance from each other, wherein only one part of each axial third orifice 345 is located at a spraying path of the spout 230 so that a water stopping area is formed on the stop wall 32 between the two axial third orifices 345 to generate a flowing reaction when the stop wall 32 is flushed by the sprayed water.

Thereby, when a watering function of the faucet is shifted to a spraying function of the spray shower head, the second recess 214 engages with the peripheral fence 321 because the valve core 20a moves downward so that a damping cavity a forms around the two third apertures 342 to be against a damping force of a downward movement of the plunger portion 21, hence a buffer effect is obtained, and the third apertures 342 are used to release water pressure.

Figure 17:
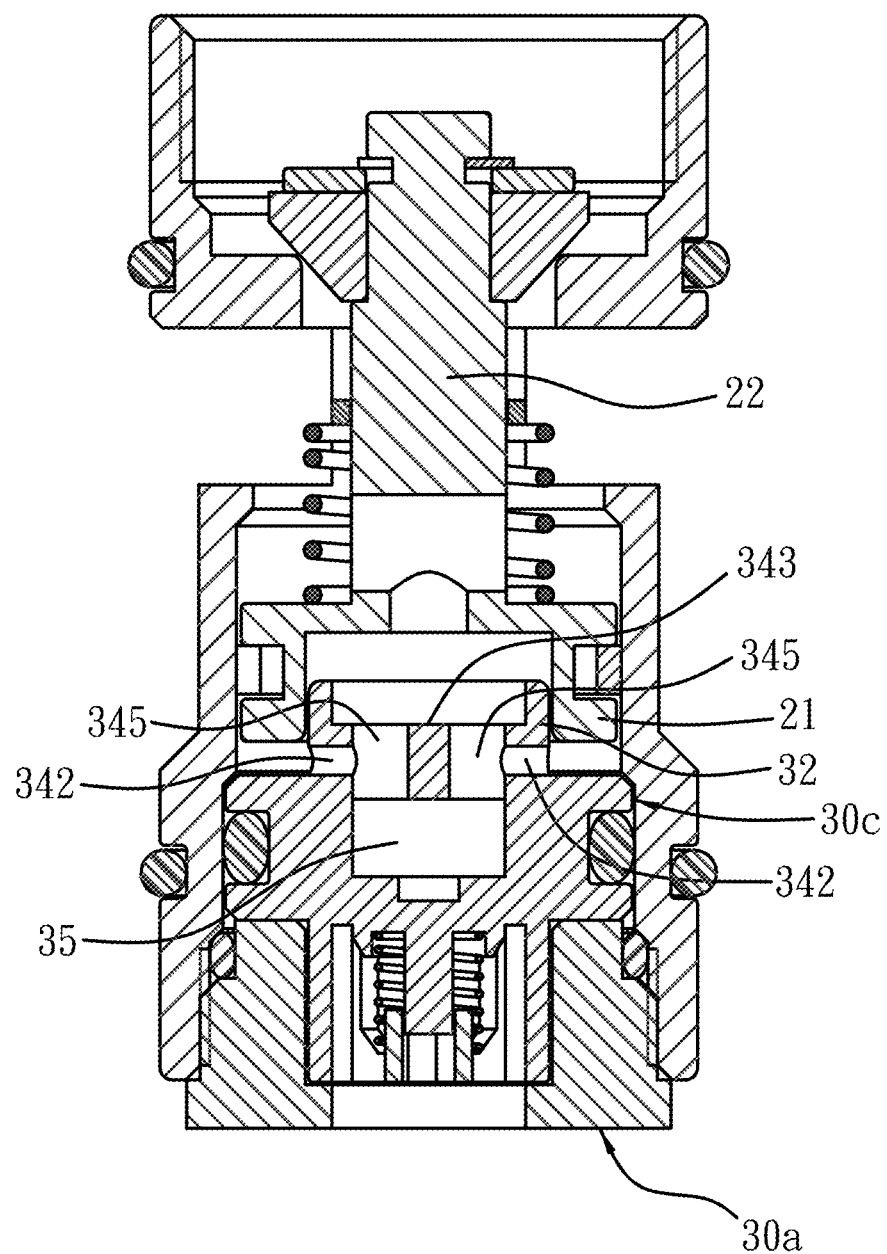
FIG. 17 is a cross sectional view showing the assembly of a valve holder, a valve member, and a buffer device of an automatic water distributor according to a fourth embodiment of the present invention.

With reference to FIG. 17, a difference of an automatic water distributor 1 according to a fourth embodiment of the present invention from that of the third embodiment comprises:

a buffer device 30 including a check valve 30c, and the check valve 30c including a stopping component 30b integrally formed on a top end thereof to lower assembly cost.

Figure 18:
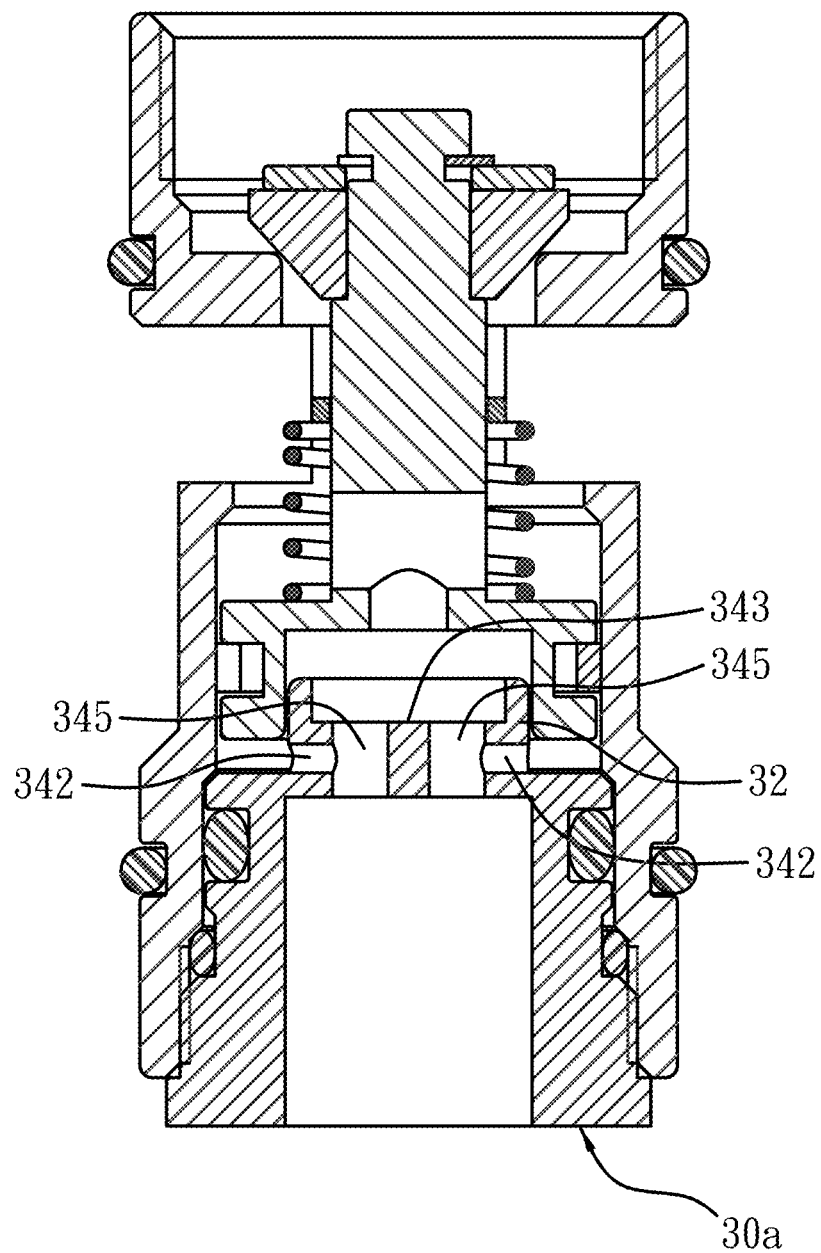
FIG. 18 is a cross sectional view showing the assembly of a valve holder, a valve member, and a buffer device of an automatic water distributor according to a fifth embodiment of the present invention.

As illustrated in FIG. 18, a difference of an automatic water distributor 1 according to a fifth embodiment of the present invention from that of the third embodiment comprises:

a buffer device 30 without the check valve 30c of the fourth embodiment so that the limiting component 30a includes a stopping component 30b directly formed thereon to lower assembly cost.

Appendix 1 shows a compared chart of a water hammer effect under a test of a conventional automatic water distributor with a check valve made of a rubber material and the automatic water distributors 1 of the first and the second embodiments, wherein a vertical coordinate represents a displacement of the valve core 20a and its unit is cm, i.e., when the watering function of the faucet is shifted to the spraying function of the spray shower head, the distributing plug 20b of the valve core 20a disengages and moves to close the hole 105; and a horizontal coordinate means a time of the movement of the valve core 20a and its unit is sec.

Therefore, at the same displacement, when the time becomes shorter, a stronger impact will generate between the distributing plug 20b of the valve core 20a and the hole 105 to obtain an obvious water hammer effect. But when the time becomes longer, the impact will decrease to lower the water hammer effect.

A first curve line 1 denotes an experiment result of the conventional automatic water distributor, wherein at the same displacement, the time is shorter, such as around 0.005 sec, and a second curve line 2 and a third curve line 3 represent experiment results of the automatic water distributors 1 of the first and the second embodiments respectively, wherein at the same displacement, the times are longer, such as around 0.018 sec and 0.011 sec respectively which are 2.2 to 3.6 times longer than that of the conventional automatic water distributor. Accordingly, the time is prolonged. i.e., the displacement speed of the valve core 20a is decreased so that the impact between the distributing plug 20b of the valve core 20a and the hole 105 is lowered greatly to decrease water hammer and noise.

While we have shown and described various embodiments in accordance with the present invention, it is clear to those skilled in the art that further embodiments may be made without departing from the scope of the present invention.

What is claimed is:

1. An automatic water distributor comprising:
a base including a chamber, a first outlet channel connected with an upper end of the chamber, a second outlet channel connected with a lower end of the chamber, and at least one inflow channel communicating with one side of the chamber; between the chamber and the first outlet channel being defined a hole;
a valve member including a valve core, the valve core including a plunger portion and a shaft portion extending upward from the plunger portion; the plunger portion moving vertically along the chamber of the base, a top end of the shaft portion inserting into the first outlet channel via the hole, and the valve core also including a first passage fixed therein, the first passage including a spout to spray water downward; a distributing plug retained on the top end of the shaft portion of the valve core and moving vertically with the valve core to disengage upward and open the hole or to move downward to close the hole;
a buffer device fixed in the chamber of the valve member and including a second passage to communicate with the spout and the second outlet channel, and including a stop wall disposed thereon and located at a spraying path of the spout, wherein the stop wall keeps a buffer distance from the spout so that after the water sprayed from the spout flushes the stop wall, a watering reaction is forced on the plunger portion of the valve core so that a downward movement of the valve core at a shifting instant is decreased.

2. The automatic water distributor as claimed in claim 1, wherein the plunger portion of the valve core includes a slot formed on an outer peripheral surface thereof to retain a C-shaped retaining loop so that the plunger moves along the chamber by using the C-shaped retaining loop.

3. The automatic water distributor as claimed in claim 1, wherein the first passage includes a radial first aperture formed adjacent to a bottom end thereof so as to communicate with the shaft portion, an axial second aperture arranged on a bottom end of the plunger portion to communicate with the first aperture, and the second aperture includes the spout defined on the bottom end thereof to spray water downward.

4. The automatic water distributor as claimed in claim 1, wherein the buffer distance is limited from 0.5 mm to 5 mm.

5. The automatic water distributor as claimed in claim 1, wherein the buffer device includes a limiting component screwed with a bottom end of the chamber; a stopping component fixed on a top end of the limiting component and including the stop wall defined thereon; a check valve fixed between the limiting component and the stopping component; the second passage of the buffer device is defined by the limiting component, the stopping component, and the check valve.

6. The automatic water distributor as claimed in claim 1, wherein the stop wall includes two axial third orifices spaced apart a predetermined distance from each other, wherein only one part of each axial third orifice is located at a spraying path of the spout so that a water stopping area is formed on the stop wall between the two axial third orifices to generate a flowing reaction.

7. The automatic water distributor as claimed in claim 1, wherein the buffer device includes a limiting component fixed on a bottom end of the chamber and the stop wall defined thereon; the stop wall includes al least one axial third orifice formed thereon and two opposite third apertures fixed on a peripheral side thereof to communicate with the axial third orifice; the axial third orifice and the third apertures are used to form one part of the second passage of the buffer device.

8. The automatic water distributor as claimed in claim 1, wherein the stop wall includes an axial second orifice to form the second passage disposed on a spraying path of the spout.

9. The automatic water distributor as claimed in claim 8, wherein a diameter of the axial second orifice is less than $\frac{1}{3}$ diameter of the spout.

10. The automatic water distributor as claimed in claim 1, wherein the buffer device includes a limiting component fixed on a bottom end of the chamber; a check valve fixed on the limiting component and including the stop wall of the buffer device defined thereon; the second passage of the buffer device is defined by the limiting component and the check valve.

11. The automatic water distributor as claimed in claim 10, wherein the stop wall includes al least one axial third orifice formed thereon and two opposite third apertures fixed on a peripheral side thereof; the axial third orifice and the third apertures are used to form one part of the second passage of the buffer device.

12. The automatic water distributor as claimed in claim 1, wherein the valve member further includes a resilient element fitted on the shaft portion of the valve core to abut against the valve core so that the distributing plug moves downward to close the hole.

13. The automatic water distributor as claimed in claim 12, wherein the resilient element is a compression spring.

14. The automatic water distributor as claimed in claim 1, wherein the base also includes a fixing seat having a cross first tunnel to define two inflow channels on two sides of the chamber respectively and the second outlet channel fixed on a lower end thereof; a valve holder fixed in the first tunnel of the fixing seat and including the hole of the base, the chamber below the hole, and one part of the first outlet channel above the hole; an internal outlet tube engaging with a top end of the valve holder and applied to define most part of the first outlet channel therein; an external outlet tube fitted on the internal outlet tube and screwed with a top end of the fixing seat; an outflow connector screwed with a top end of the external outlet tube so that the internal outlet tube and the valve holder are received and limited among the outflow connector, the external outlet tube, and the fixing seat, and the outflow connector is capable of defining a small part of the first outlet channel.

15. The automatic water distributor as claimed in claim 14, wherein the valve holder also includes a second tunnel arranged therein, the second tunnel includes a first compartment, a groove, a second compartment between the first compartment and the groove, a guiding bore between the second compartment and the first compartment, and the hole between the second compartment and the groove; the first compartment, the guiding bore, and the second compartment are provided to define the chamber; the groove is used to define a small part of the first outlet channel; and guiding bore is used to insert the shaft portion of the valve core therein.

16. The automatic water distributor as claimed in claim 15, wherein the valve holder further includes two opposite first inlets disposed on a peripheral wall thereof to communicate with the inflow channels and a second compartment of the second tunnel and two opposite second inlets to communicate with the inflow channels and a first compartment of the second tunnel individually.

17. The automatic water distributor as claimed in claim 15, wherein the buffer device includes:
  a limiting component screwed with a bottom end of the first compartment and includes a first recess secured on a top end thereof, the first recess includes a first orifice disposed on a central position of a bottom wall thereof;
  a stopping component having an opening facing downward and formed in a cylinder shape, an outer wall to screw with the first recess of the positioning component, and a cylindrical room defined therein, the cylindrical room including a second positioning fringe disposed on an inner wall thereof and two opposite third apertures fixed on a peripheral side thereof to guide the water from the spout to further flow into the cylindrical room; the stop wall is comprised of a top face of the stopping component, and the buffer distance is formed from the top face of the stopping component to a bottom face of the plunger portion;
  a check valve fixed in the first recess of the limiting component and the cylindrical room of the stopping component and is limited by the second positioning fringe of the stopping component and includes a third passage formed therein;
  the second passage of the buffer device is defined by the third apertures, a part of the cylindrical room, the third passage of the check valve, and the first orifice of the limiting component.

18. The automatic water distributor as claimed in claim 17, wherein the plunger portion of the valve core includes a second recess fixed on a bottom end thereof; the stop wall including a peripheral fence extending upward therefrom so that the stopping component is fitted into the second recess, and the stop wall includes at least one axial third orifice.

\* \* \* \* \*